US008751423B2

(12) United States Patent
Pandey et al.

(10) Patent No.: US 8,751,423 B2
(45) Date of Patent: Jun. 10, 2014

(54) TURBINE PERFORMANCE DIAGNOSTIC SYSTEM AND METHODS

(75) Inventors: Achalesh Kumar Pandey, Greenville, SC (US); Subrat Nanda, Niskayuna, NY (US); Maria Cecilia Mazzaro, Simpsonville, SC (US); Atanu Talukdar, Karnataka (IN)

(73) Assignee: General Electric Company, Schenectady, NY (US)

( * ) Notice: Subject to any disclaimer, the term of this patent is extended or adjusted under 35 U.S.C. 154(b) by 639 days.

(21) Appl. No.: 12/956,689

(22) Filed: Nov. 30, 2010

(65) Prior Publication Data

US 2012/0136819 A1 May 31, 2012

(51) Int. Cl.
G06N 5/00 (2006.01)

(52) U.S. Cl.
USPC .............................. 706/14; 702/183; 701/100

(58) Field of Classification Search
USPC .......................................................... 706/14
See application file for complete search history.

(56) References Cited

U.S. PATENT DOCUMENTS

| 4,548,040 | A | 10/1985 | Miller et al. |
| 5,517,852 | A | 5/1996 | Woodason et al. |
| 6,063,129 | A | 5/2000 | Dadd et al. |
| 6,498,978 | B2 | 12/2002 | Leamy et al. |
| 6,591,182 | B1 | 7/2003 | Cece et al. |
| 6,687,596 | B2 | 2/2004 | Humerickhouse et al. |
| 6,804,612 | B2 | 10/2004 | Chow et al. |
| 6,823,675 | B2 | 11/2004 | Brunell et al. |
| 6,909,960 | B2 | 6/2005 | Volponi et al. |
| 7,140,186 | B2 | 11/2006 | Venkateswaran et al. |
| 7,286,923 | B2 | 10/2007 | Pomeroy et al. |
| 7,441,448 | B2 | 10/2008 | Volponi |
| 2004/0030417 | A1 | 2/2004 | Gribble et al. |
| 2005/0096832 | A1 | 5/2005 | Takada et al. |
| 2005/0261820 | A1 | 11/2005 | Feeney et al. |
| 2007/0078585 | A1 | 4/2007 | Pomeroy et al. |
| 2007/0203669 | A1 | 8/2007 | Hayashi |
| 2007/0234730 | A1 | 10/2007 | Markham et al. |
| 2008/0027616 | A1 | 1/2008 | Zhang et al. |
| 2008/0120074 | A1 | 5/2008 | Volponi |
| 2008/0126012 | A1 | 5/2008 | Volponi |
| 2008/0154473 | A1 | 6/2008 | Volponi et al. |
| 2008/0173330 | A1 | 7/2008 | Wagner |
| 2008/0177505 | A1 | 7/2008 | Volponi |
| 2008/0221835 | A1 | 9/2008 | Volponi |
| 2009/0055130 | A1* | 2/2009 | Pandey et al. ................. 702/183 |

(Continued)

FOREIGN PATENT DOCUMENTS

EP 0050610 B1 12/1986
EP 1936460 A2 6/2008

(Continued)

*Primary Examiner* — Alan Chen
*Assistant Examiner* — Kalpana Bharadwaj
(74) *Attorney, Agent, or Firm* — Cantor Colburn LLP

(57) ABSTRACT

A turbine performance diagnostic system creates a performance report for one or more turbines and includes an assessment module that receives operating data from at least one turbine and produces a performance report from the operating data. The assessment module includes a change detection module configured to determine when at least one parameter has changed beyond an associated threshold and generate an alarm and a root cause analyzer coupled to the change detection module that predicts a root cause of the alarm utilizing a Bayesian Belief Network (BBN). The performance report includes an indication of the predicted root cause.

13 Claims, 8 Drawing Sheets

(56) References Cited

U.S. PATENT DOCUMENTS

| | | | |
|---|---|---|---|
| 2010/0116292 A1* | 5/2010 | Wagner | 134/18 |
| 2011/0142729 A1* | 6/2011 | McGehee et al. | 422/211 |
| 2011/0153273 A1* | 6/2011 | Lipowsky et al. | 702/181 |

FOREIGN PATENT DOCUMENTS

| | | |
|---|---|---|
| JP | 9112294 A | 4/1997 |
| JP | 2004108291 A | 4/2004 |
| JP | 2005248848 A | 9/2005 |
| JP | 2006057595 A | 3/2006 |
| JP | 2007002673 A | 1/2007 |
| JP | 2007107446 A | 4/2007 |
| JP | 2007192138 A | 8/2007 |
| JP | 2008032011 A | 2/2008 |
| JP | 2008088961 A | 4/2008 |
| WO | 03058362 A1 | 7/2003 |
| WO | 03062618 A1 | 7/2003 |
| WO | 2008130276 A2 | 10/2008 |

* cited by examiner

FIG. 4

| HR Alarm | DWATT Alarm | Compressor Efficiency | Turbine Efficiency | Compressor Flow | Water Wash | Sensor Drift x1 drift | Sensor Drift x2 | Sensor Drift x3 | Sensor Drift x4 |
|---|---|---|---|---|---|---|---|---|---|
| 1 | 1 | 1 | 0 | 0 | 0 | 1 | 0 | 1 | 0 |

TURBINE PERFORMANCE DIAGNOSTIC SYSTEM AND METHODS

BACKGROUND OF THE INVENTION

The subject matter disclosed herein relates to turbines and, in particular, to monitoring performance and predicting the root causes of changes in the operation of turbines.

Electrical power generation typically includes the utilization of one or more turbines. These turbines, like any other mechanical device, may need inspection from time to time to ensure proper operation. One approach has been to have periodic inspections. In some cases, however, it may be determined that particular turbines (or portions thereof) may not need to be inspected as often as others even if they are of the same type. Thus, an inspection may not be necessary for one turbine while it may be for another.

High availability and reliability of power generation systems has been a major requisite of the electric utility industry for many years. The high cost of unreliability and forced outages is well known. Improper maintenance or operational anomaly detection may lead to turbine-forced outages. Early detection of such anomalies is important in preventing and reducing lengthy turbine forced outages.

A typical inspection may require that a turbine be shut down during the inspection. In such a case, at least a portion of a power generation plant's production capability may be hampered. Reducing the ability to generate power may have real economic costs associated with it. In addition, the inspection itself costs money. For at least these two reasons, it may be beneficial to perform inspections or maintenance only when and where needed.

BRIEF DESCRIPTION OF THE INVENTION

According to one aspect of the invention, a turbine performance diagnostic system that creates a performance report for one or more turbines is disclosed. The system of this aspect includes an assessment module that receives operating data from at least one turbine and produces a performance report from the operating data. The assessment module of this aspect includes a change detection module configured to determine when at least one parameter has changed beyond an associated threshold and generate an alarm, and a root cause analyzer coupled to the change detection module that predicts a root cause of the alarm utilizing a Bayesian Belief Network (BBN). In this aspect, the performance report includes an indication of the predicted root cause.

According to another aspect of the invention, a method of determining a root cause of a turbine alarm for at least one turbine is disclosed. The method of this aspect includes: determining at a computing device that the turbine alarm exists; determining at the computing device which, if any, other alarm conditions exist when the alarm conditions exist to create an event portion; and predicting the root cause of the event from the event portion by comparing the event portion to a Bayesian Belief Network (BBN).

According to another aspect of the invention, a system for creating a scorecard for one or more turbines is disclosed. In this aspect, the system includes an assessment module that receives operating data from at least one turbine and produces the scorecard from the operating data. In this aspect, the assessment module includes a change detection module configured to determine when at least one parameter has changed beyond an associated threshold and generate an alarm and a scorecard generator that generates the scorecard, the scorecard including a status indication, the status indication being based on a characteristic of the parameter that generated the alarm.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 shows an example of a portion of an evidence matrix according to one embodiment;

The detailed description explains embodiments of the invention, together with advantages and features, by way of example with reference to the drawings.

DETAILED DESCRIPTION OF THE INVENTION

Embodiments disclosed herein are directed to systems and methods for monitoring turbine performance. In the disclosed systems and methods, key performance parameters of the turbine are tracked and, from this tracking, changes in these parameters can be detected. In some embodiments, the changes result in the generation of an alarm or other advisory to a user/operator.

In one embodiment, when an alarm is generated, the state of some or all of the performance parameters is recorded. This recorded information can be combined across a fleet to generate a fleet level performance degradation tracking scorecard. According to yet another embodiment, based on the information recorded when an alarm is generated, probabilistic root cause analysis can be performed. In one embodiment, the root cause analysis is based on results of a Bayesian Belief Network.

Figure 1:
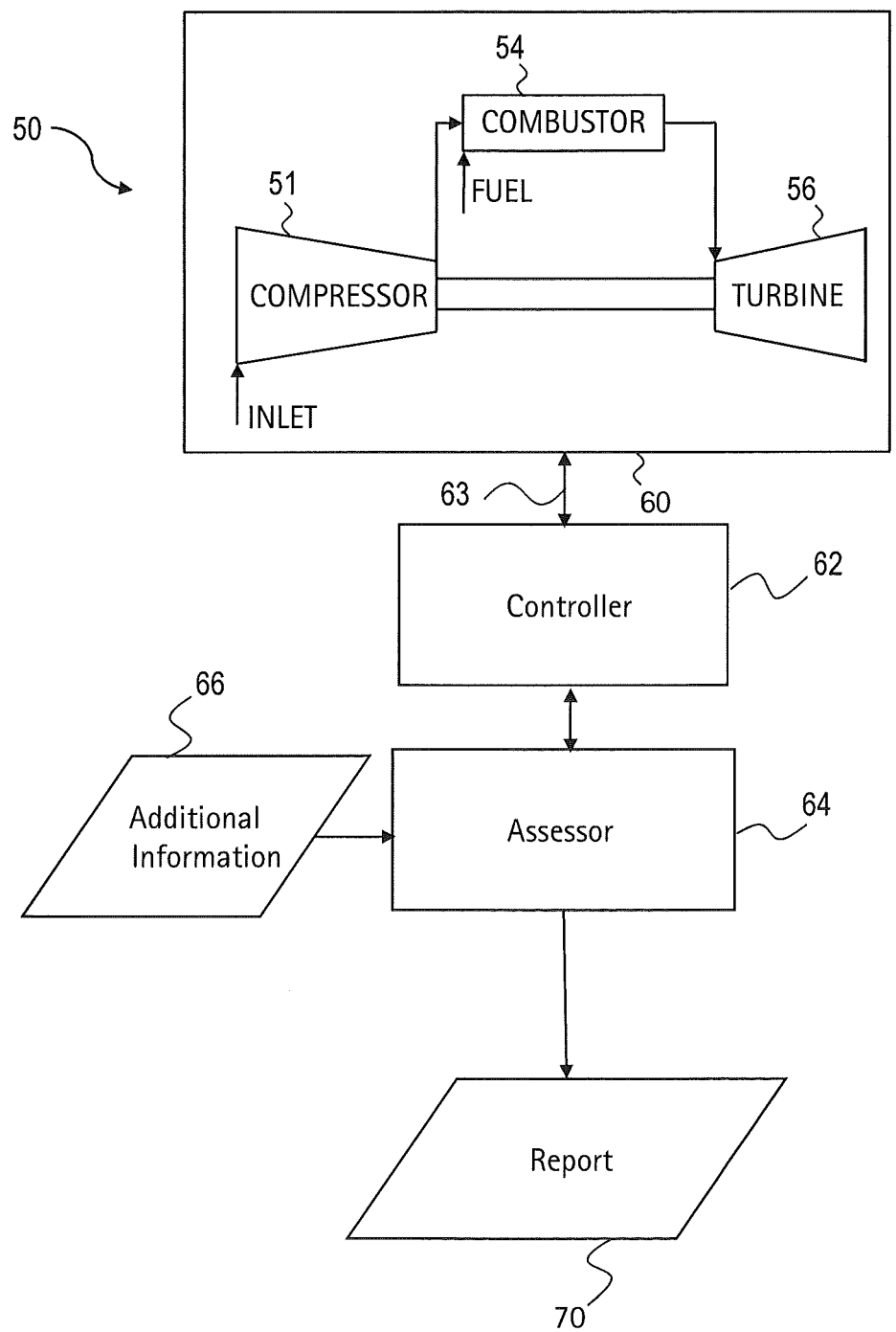
FIG. 1 is dataflow diagram for a system according to one embodiment of the present invention.

FIG. 1 shows a dataflow diagram of a system 50 according to one embodiment. The system 50 may include one or more turbines 60. For simplicity, only one turbine 60 is illustrated in FIG. 1. The turbine 60 can be any type of type of turbine. Indeed, the turbine 60 could be a gas turbine, a steam turbine or other device that converts a fuel into electricity.

In the event the turbine 60 is a gas turbine, the turbine 60 may include a compressor 52 to draw in and compress air; a combustor 54 (or burner) to add fuel to heat the compressed air; and a turbine section 56 to extract power from the hot air flow.

The system 50 may also include a controller 62 coupled to the turbine 60. The controller 62 receives information from the turbine 60 and, based on that information, may vary the operation of the turbine 60. Accordingly, the communication between the controller 62 and the turbine 60 may be bidirectional as indicated by communication pathway 63.

In one embodiment, the controller 62 is coupled to an assessor 64. In such an embodiment, the assessor 64 receives information from the controller 62 and optionally, additional information 66 from additional information sources (not shown) to produce one or more reports 70.

The additional information 66 may include, but is not limited to, on-site monitoring information. In one embodiment, the on-site monitoring information is related to the compressor 52. This on-site monitoring information may include, but is not limited to, hours of operation, inlet conditioning, fogger information, part load operation, water wash information, inlet air quality and other sensor information. Of course, other types of information could be included in the additional information 66.

The assessor 64 may be implemented in hardware, software, or some combination thereof (firmware). The report 70 can include one or more different types of information. In one embodiment, the report 70 includes at least one of a fleet level performance scorecard, a unit level performance scorecard, and a root cause report.

Figure 2:
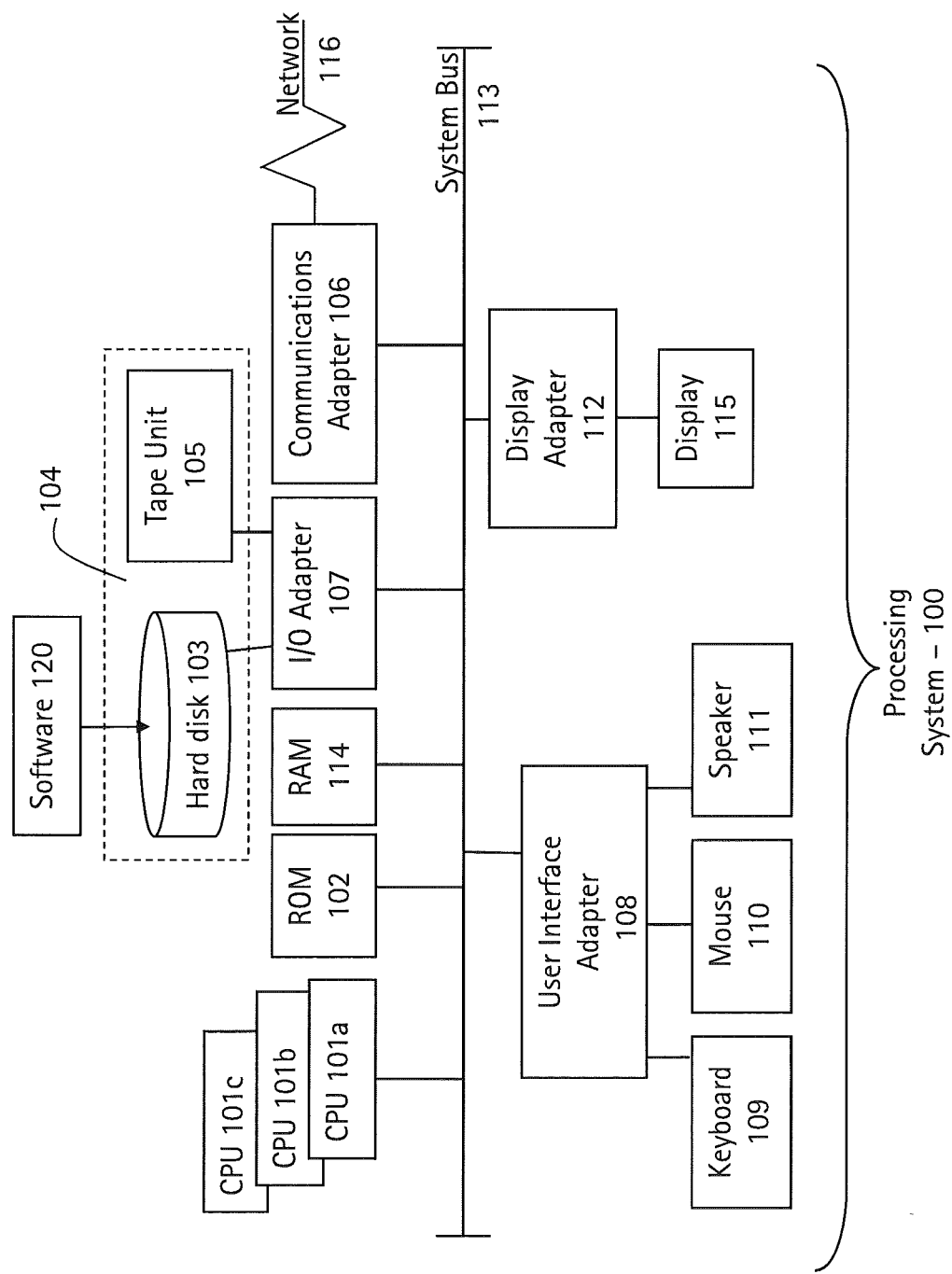
FIG. 2 illustrates a computing system on which embodiments of the present invention may be implemented.

Referring to FIG. 2, there is shown an embodiment of a processing system 100 for implementing the teachings herein. The processing system 100 may include the assessor 64 (FIG. 1). In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the system 100.

FIG. 2 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 can be connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 are all interconnected to bus 113 via user interface adapter 108, which may include, for example, an I/O chip integrating multiple device adapters into a single integrated circuit.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Any computer operating system may be utilized by the system 100. As illustrated, the system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network 116 through any suitable network interface, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 may include machine-readable instructions stored on machine-readable media (for example, the hard disk 104) to execute one or more methods disclosed herein. As discussed herein, the instructions may be referred to as "software" 120. The software 120 may be produced using software development tools as are known in the art. The software 120 may include various tools and features for providing user interaction capabilities as are known in the art.

Figure 3:
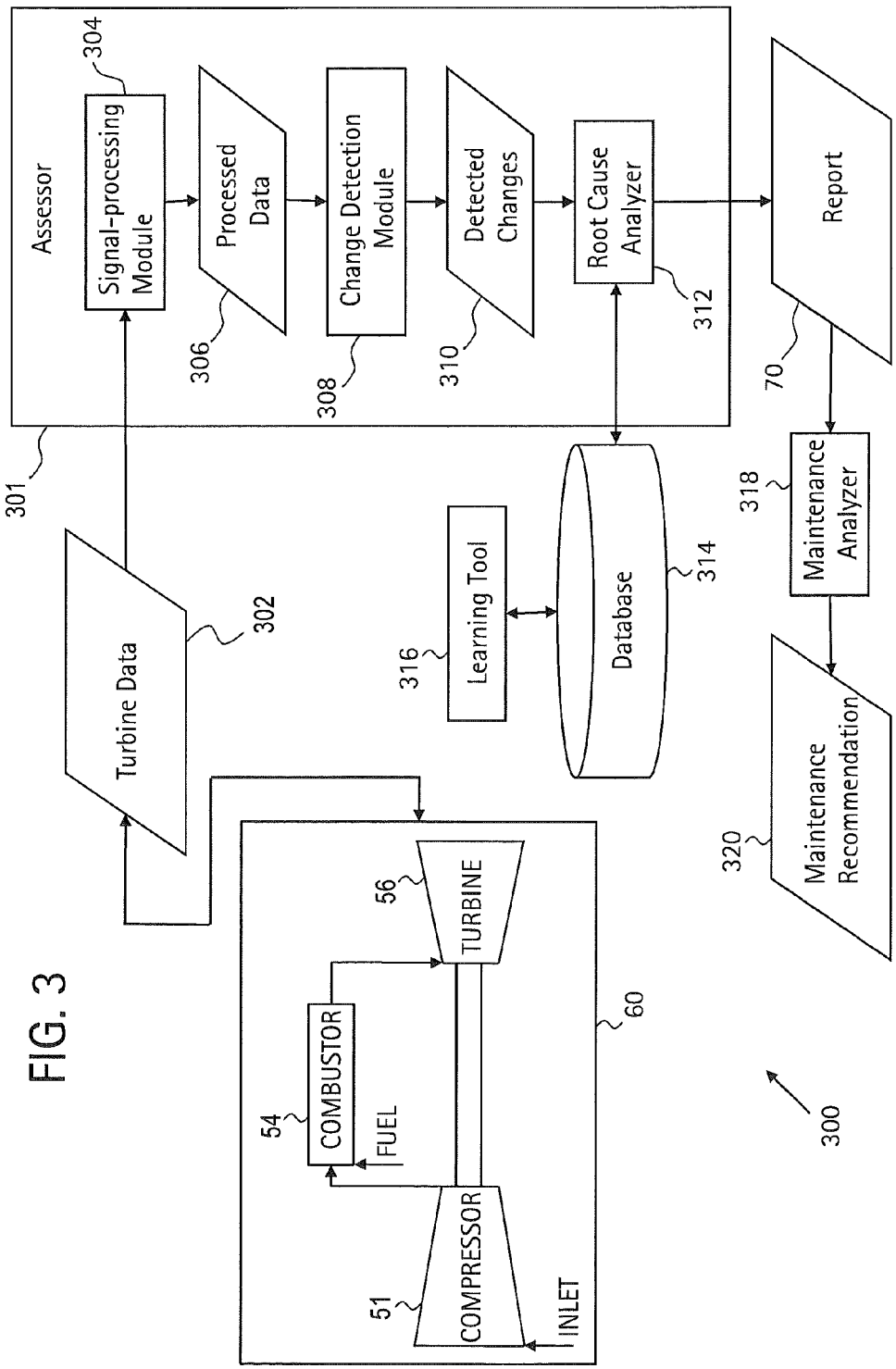
FIG. 3 is dataflow diagram illustrating a system according to one embodiment.

FIG. 3 is a dataflow diagram of a system 300 according to one embodiment. In this embodiment, the turbine 60 produces turbine data 302. Of course, the turbine data 302 could be compiled at a controller (not shown) or other computing device that receives information from a turbine or other machine. It shall be understood that while the description of FIG. 3 relates to a turbine, the system 300 could replace the turbine with any type of machine from which data may be collected.

The turbine data 302 can include one or more of: the heat rate (HR), the measured power output (DWATT), turbine speed (high pressure shaft) (TNH), gross corrected power, atmospheric pressure (AFPAP), measured turbine exhaust pressure loss (AFPEP), compressor efficiency and compressor flow rate. In addition, the turbine data 302 can include times when, for example, a water wash was performed on the compressor.

The turbine data 302 is provided to an assessor 301. The assessor 301 could be the same as or a portion of the assessor 64 shown in FIG. 1. In one embodiment, the assessor 301 includes a signal-processing module 304. The signal-processing module 304 filters and sorts the turbine data 302 in one embodiment. In one embodiment, the signal-processing module 304 could be omitted.

In the event that that signal-processing module 304 is present, it can perform one or more of the following: operating mode filtering; signal smoothing (using either median or Savitzky-Golay (SG)) filtering; and data normalization. Of course, the signal-processing module 304 could perform other types of processing on the turbine data 302. Regardless of the type of filtering of processing, the signal-processing module 304 produces processed data 306.

The processed data 306 is provided to a change detection module 308 in one embodiment. As described above, the signal-processing module 304 can be omitted. In such a case, the turbine data 302 can be provided directly to the change detection module 308.

The change detection module 308 is generally configured to test data over time and detect time-based variations in the turbine data 302. In particular, the change detection module 306 applies tests to the data and determines if any of the values or changes in the values exceeds an associated threshold.

There are several types of detection schemes (tests) that can be implemented by the change detection module 306. These schemes include, but are not limited to, a Hotelling $T^2$ transform test, a Likelihood Ratio test, a combination of the Hotelling $T^2$ transform test and the Likelihood Ratio test, a z score calculation, a two sample t test, an entropy base test, an offline water detection test, a mean or base value shift test and a high slope detection test. In one embodiment, one or more of these tests are performed on one or both of the HR and DWATT values received from the turbine 60. Of course, other types of tests could be performed and those listed can be implemented by one of skill in the art. In one embodiment, the detection of an undesirable change in any of the parameters in the turbine data 302 can result in the generation of an alarm.

The change detection module 308 produces detected changes data 310. This detected changes data 310 represents the particular alarms (or lack thereof) generated based on the tests performed in the change detection module 308. In one embodiment, the detected changes data 310 can include a table of the states of all of the monitored turbine parameters as they existed when an alarm was generated. The detected changes data 310 can be combined to form an evidence matrix in one embodiment as described below.

FIG. 4 shows an example portion 400 of an evidence matrix according to one embodiment. The portion 400 illustrates an entry in an evidence matrix where both an HR alarm (column 402) and a DWATT alarm (column 404) were created for a particular unit (e.g., for a particular turbine). Of course, other types of alarms could be included in the portion 400. The portion 400 also includes indications of the state of other additional parameters 406-420. The states of the additional parameters 406-420 indicate whether those parameters where within normal operating conditions or had been performed recently (in the case of, for example, water washes) when the HR or DWATT alarm was created.

Figure 5:
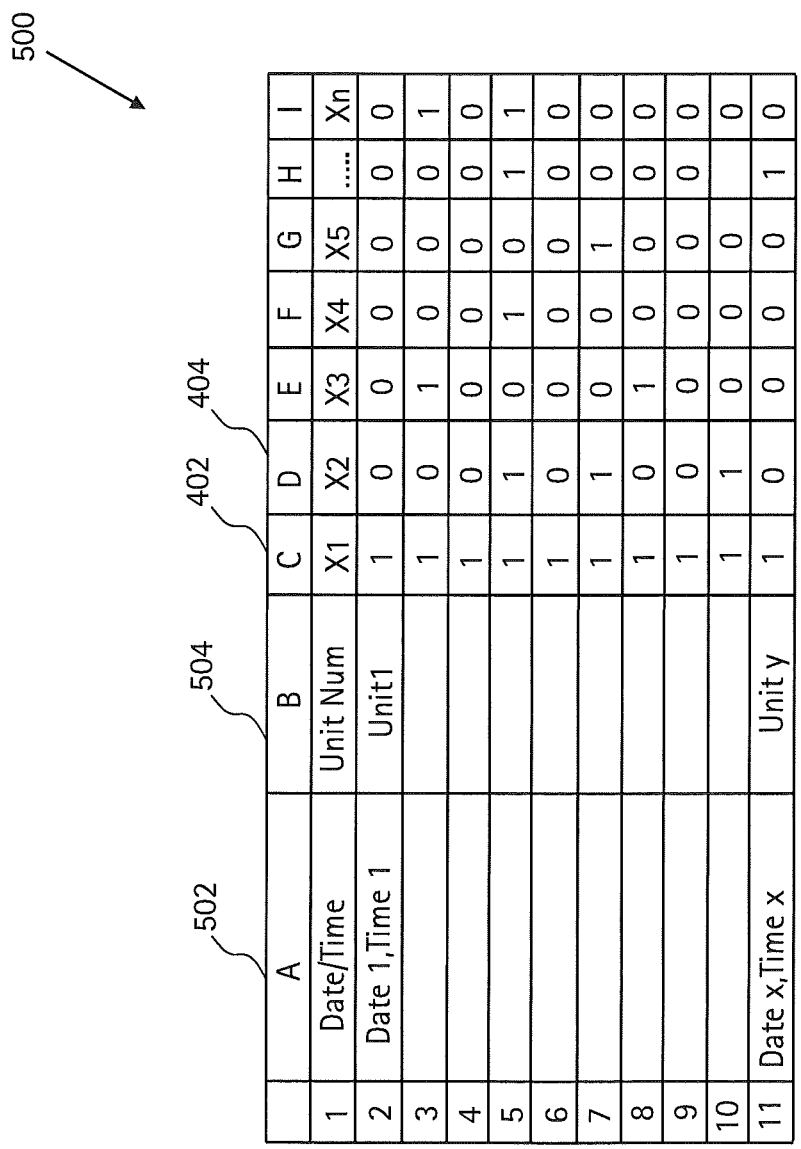
FIG. 5 shows an example of an evidence matrix utilized by, and in accordance with, embodiments of the present invention.

Multiple portions 400 can be created over time for an individual unit and across a fleet of units. The portions 400 can all be combined to form an evidence matrix 500 as shown in FIG. 5. The evidence matrix 500 identifies the unit (column 502) and the time of the alarm (column 504) in one embodiment. It shall be understood that the portion 400 and the evidence matrix 500 can include only entries for when the turbine or a portion thereof (e.g., the compressor) failed in one embodiment. Of course, the definition of failure is variable and depends on the context. According to one embodiment, each entry in the evidence matrix 500 can also include an indication of the actual failure cause.

Referring again to FIG. 3, the evidence matrix 500 can be formed from individual portions 400 contained in the detected changes data 310 and stored in a database 314. The evidence matrix 500 can be utilized as part of a root cause analysis (RCA) according to one embodiment of the present invention. In one embodiment, the RCA includes utilizing a BBN model. Indeed, it shall be understood that the BBN model could be created from the evidence matrix in one embodiment.

The detected changes data 310 is provided to a root cause analyzer 312. In one embodiment, the root cause analyzer 312 analyzes the detected changes 310 for a current alarm condition and creates a prediction of the root cause of the alarm. For example, assume that an HR alarm was encountered at the same time that the compressor was receiving a water wash. In such a case, the HR alarm could be predicted to be causes by the fact that the water wash was occurring. It shall be understood that the above example is simplistic and is presented by way of example, not as a limitation.

Figure 6:
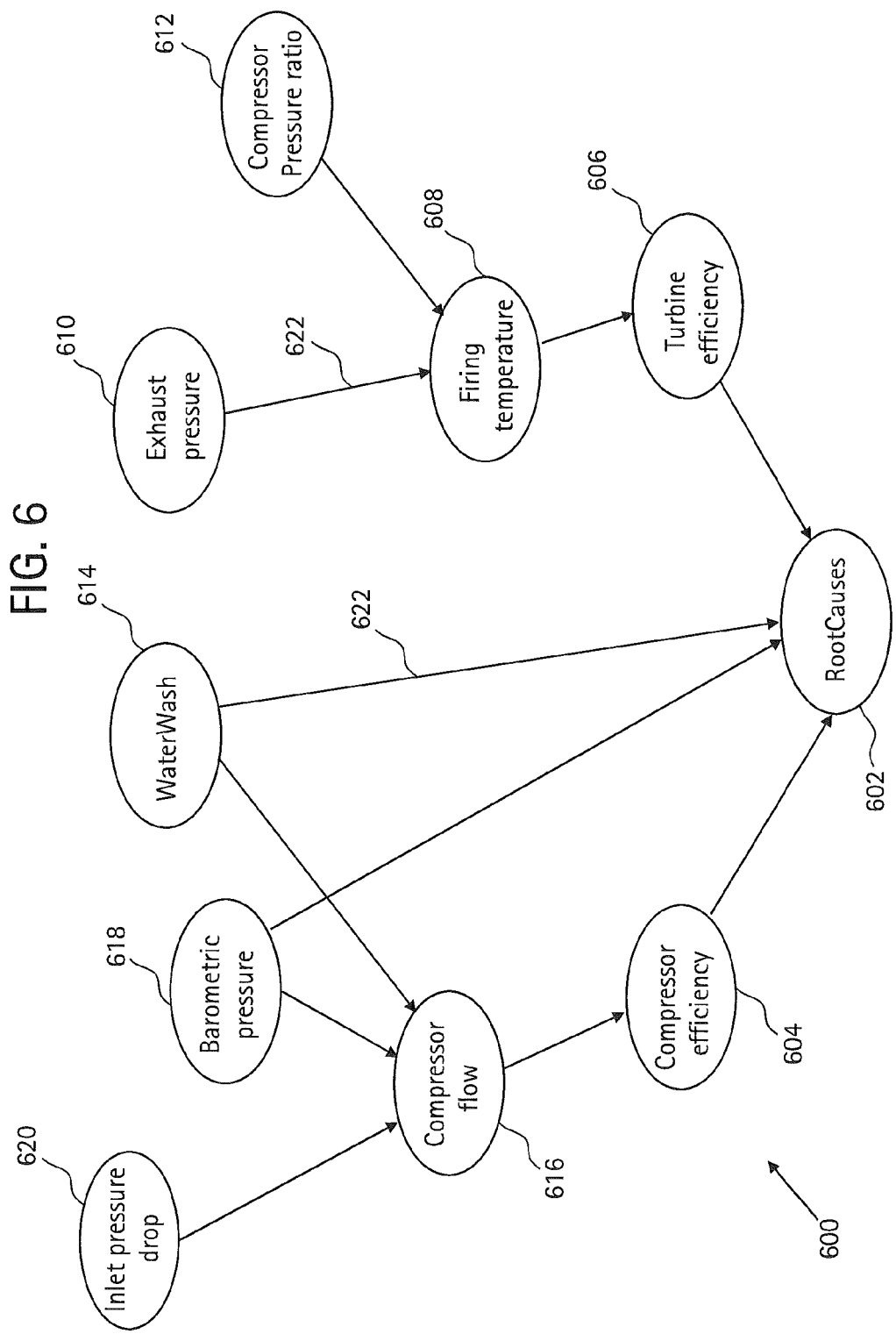
FIG. 6 illustrates an example of a Bayesian Belief Network (BBN) according to one embodiment.

FIG. 6 illustrates a construct 600 utilized in the root cause analyzer 314 in one embodiment. The construct can be formed based on, for example, examination of an evidence matrix 500 (FIG. 5). In one embodiment, a more complete construct that provides a probabilistic framework for all possible measured values can be created from system knowledge and the evidence matrix and then trimmed to remove non-contributing or non-detectable information according to known principles. The construct 600 illustrated in FIG. 6 is such a trimmed version.

As discussed above, each entry in the evidence matrix can include an indication of the actual cause of the alarm state. Such actual causes are also referred to herein as "root causes" and are shown in FIG. 6 as by root cause bubble 602. It shall be understood that the causes can be selected from, in one embodiment, compressor issues, turbine malfunction, inlet condition changes, firing temperature changes, water wash, sensor calibration issues, bleed valve open and filter change outs to name but a few.

A separate construct 600 can be developed for each root cause. The construct 600 can include other, different parameters 604-620. The particular arrangement and connections between the parameters is based on the actual observed data in one embodiment.

The construct 600 forms the basis for a BBN and is based on the belief of a human expert. In more detail, a BBN is graphical representation of the variable of a domain of interest and represents the relationships among variable in a construct 600 as illustrated in FIG. 6. In one embodiment, the construct 600 is a direct acyclic graph (DAG). In a BBN, the variables (604-620) have a finite set of states and are connected by edges (e.g., edges 622) to form a DAG. Each variable A has parents, $B_1 \ldots, B_n$. For example, in FIG. 6, bubbles 614, 618 and 620 are parents of bubble 616. The probability that B happened given that A happened is defined by Baye's Rule which is illustrated in Eg. 1.

$$P(b_i \mid a) = \frac{P(a \mid b_i)P(b_i)}{P(a)} = kP(a \mid b_i) \tag{1}$$

Referring again to FIG. 3, the root cause analyzer 312 can compare current detected changes data 310 to the BBN shown in FIG. 6 for one or more of the root causes. Such a comparison will yield a prediction of the root cause based on the state (alarm or not) of all of the measurable parameters. In such an embodiment, the report 70 includes an indication of the root cause that most closely matches the current conditions. Of course, the report 70 could include a listing of all of the root causes defined in the system and the probability that each of them is the root cause of the current alarms.

In one embodiment, based on the root cause a repair or corrective action is actually taken. The actual cause of the alarm may turn out to be different than that predicted by the root cause analyzer 312. In one embodiment, the system illustrated in FIG. 3 includes a learning tool 316 that causes one or more of the BBN's to be changed based on this new information. In addition, the BBN's can be updated over time as more data is collected.

According to another embodiment, the systems and methods disclosed herein can be utilized to provide maintenance recommendations. To that end, the system can also include maintenance analyzer 318. The maintenance analyzer 318 is configured to analyze the report 70 and produce a maintenance recommendation 320. Suppose for example that the report 70 indicates that a particular turbine has an 80% chance of low compressor efficiency (i.e. that there is 80% chance that the compressor is the cause of the current alarm). Based on rules, the maintenance analyzer 318 may create a maintenance recommendation 320 stating that the compressor related components are to be checked during the next maintenance interval. Of course, the particular rules utilized by the maintenance analyzer 318 can be determined and varied based on the context.

Figure 7:
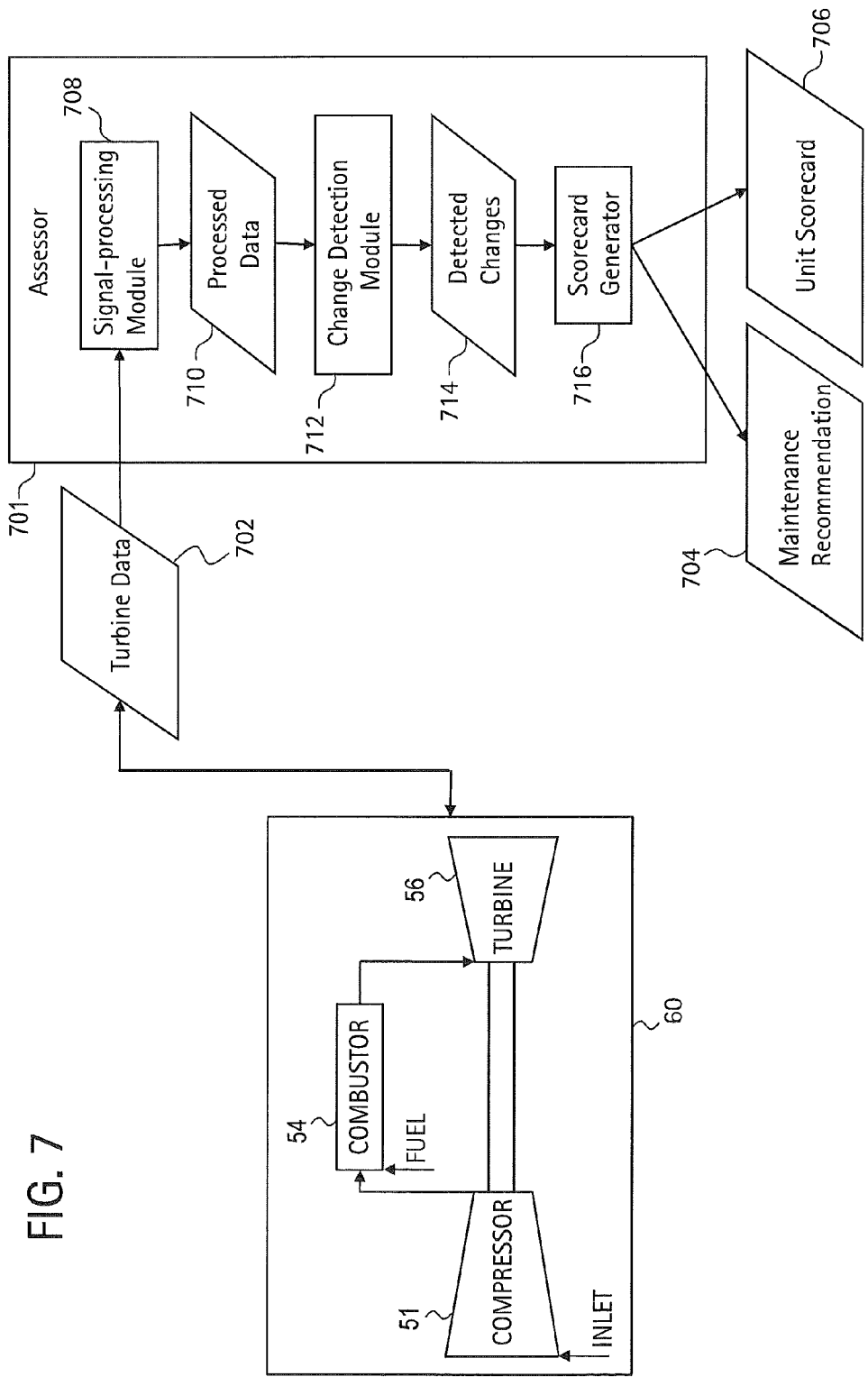
FIG. 7 is dataflow diagram illustrating a system according to another embodiment.

FIG. 7 is a dataflow diagram illustrating a system 700 according to another embodiment of the present invention. It shall be understood that the system 700 illustrated in FIG. 7 could be integrated into the system 300 shown in FIG. 3. In this embodiment, the turbine 60 produces turbine data 702. Of course, the turbine data 702 could be compiled at a controller (not shown) or other computing device that receives information from a turbine or other machine. It shall be understood that while the description of FIG. 7 relates to a turbine, the system 700 could replace the turbine with any type of machine from which data may be collected. Furthermore, it shall be understood that the system 700 can include multiple turbines 60 that form a fleet.

In general, from the turbine data 702 the system 700 produces a scorecard. The scorecard can be either a fleet wide scorecard 704 or a unit scorecard 706 for a particular unit. In one embodiment, the fleet wide scorecard 704 includes several unit scorecards 706 combined together.

In more detail, the turbine data 702 is provided to an assessor 701 that creates one or both of the scorecards 704, 706 there from. The turbine data 702 can include one or more of: the heat rate (HR), the measured power output (DWATT), turbine speed (high pressure shaft) (TNH), gross corrected power, atmospheric pressure (AFPAP), measured turbine exhaust pressure loss (AFPEP), compressor efficiency (COMP_EFF) and compressor flow rate (COMP_FLOW). In addition, the turbine data 702 can include times when, for example, a water wash was performed on the compressor.

The turbine data 702 is provided to an assessor 701. The assessor 701 could be the same as or a portion of the assessor 64 shown in FIG. 1. In one embodiment, the assessor 701 includes a signal-processing module 708. The signal-processing module 708 filters and sorts the turbine data 702 in one embodiment. In one embodiment, the signal-processing module 708 could be omitted. The signal-processing module 708 could perform some or all of the same functions as the signal-processing module 304 shown in FIG. 3.

According to one embodiment, the signal processing module 708 produces processed data 710. The processed data 710 includes, in one embodiment, a series of pairs of heat rate data where each pair indicates the heat rate following successive water washes. Of course, other data pairs related to a water wash could be included. In addition, any of the other turbine data 702 could be included in the processed data 710 (whether processed or not).

The assessor 701 also includes a change detection module 712 that determines if the change in the pairs or other information exceeds a threshold and outputs detected changes data 714.

The assessor 701 of this embodiment may also include a scorecard generator 712 configured to generate one or both of the fleet wide scorecard 704 and the unit scorecard 706 from the detected changes. In one embodiment, the unit scorecard 706 includes an indication of whether the performance of the unit is degrading and, if so, by how much. One metric that can be utilized for such a determination is a mean shift change.

Figure 8:
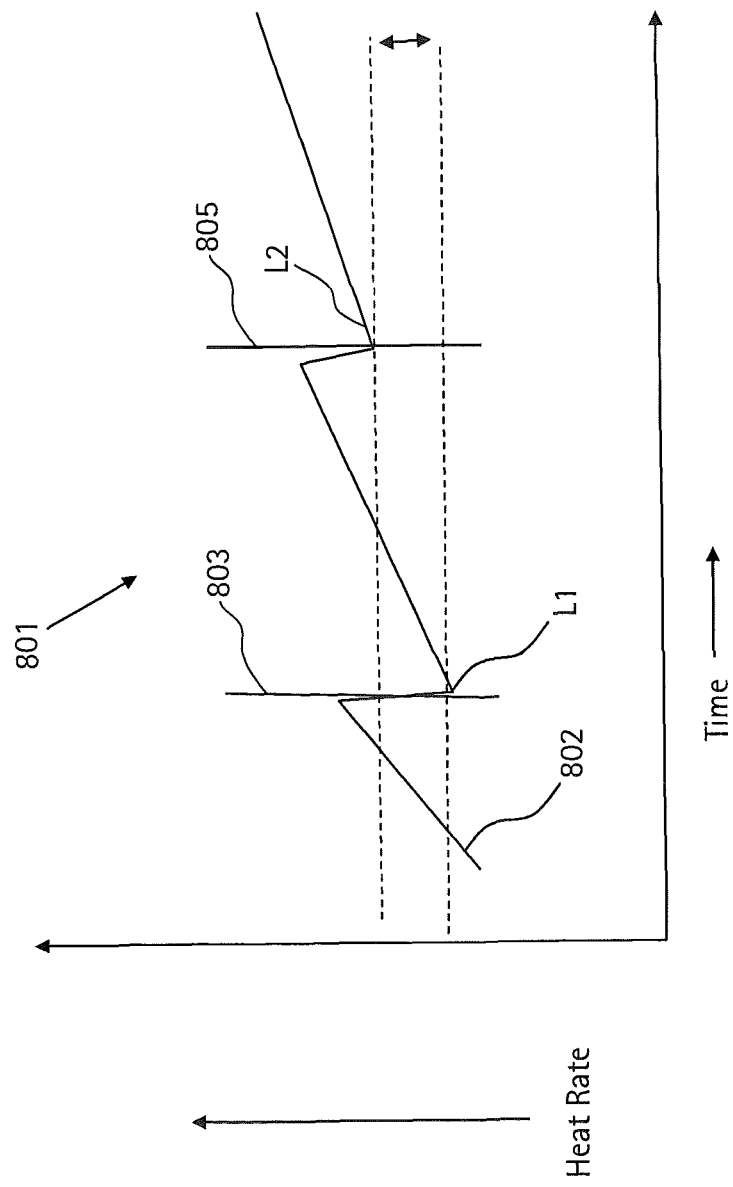
FIG. 8 is a graph illustrating heat rate degradation over time.

FIG. 8 shows a graph of performance degradation over time. In a first time period 801, the heat rate (trace 802) is at first level, L1 following a first water wash (illustrated by line 803). In a second time period 804 the heat rate 802 is a second level following a second water wash 805. The difference between the first level, L1, and the second level, L2, indicates an amount of performance degradation that can be tracked overtime. The change detection module 712 can determine the difference between L1 and L2 (FIG. 7) in one embodiment. In one embodiment, the unit scorecard 706 can include different values based on the level of performance degradation.

For example, and referring again to FIG. 7, the unit scorecard 706 could indicate that the performance is not degrading, is degrading by less than one percent per wash or is degrading by more than one percent per wash. Of course, such information could also be used to predict future degradation of the unit over time.

In the case of the fleet wide scorecard 704, for the performance degradation of the fleet as a whole could be modeled based on unit scorecards 706 for each performance metric.

In one embodiment, performance degradation predictions can be included in the fleet wide scorecard 704, the unit scorecard, or both. In one embodiment, such predictions are based on a model created by a Kalman Filtering process. In such a process the heat rate is modeled, initially, by equation 2:

$$HR(k)=a(k) \times \text{time}(k)+c(k) \quad (2)$$

where a(k) is the slope of the degradation curve and c(k) is the intercept. In one embodiment, the process equation is modeled as a random walk and applied to current data until an appropriate model is achieved. This model can then be used to predict the rate of change of the heat rate in the future.

In view of the above, in one embodiment, the system shown in FIG. 7 can utilize current parameters and an operating profile of the turbine to predict a rate of change in its heat rate values now or at a future time. Such future predictions can also be utilized by the maintenance analyzer 318 (FIG. 3) to determine when specific maintenance may be performed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine performance diagnostic system including one or more central processing units (CPUs) and memory, the one or more CPUs configured to execute software stored in memory to control the turbine performance diagnostic system to receive operating data from at least one turbine and create a performance report for one or more turbines, the system comprising:

an assessment module that receives the operating data from the at least one turbine and produces a performance report from the operating data, the assessment module including:

a change detection module configured to determine when at least one parameter has changed beyond an associated threshold and generate an alarm; and a root cause analyzer coupled to the change detection module that predicts a root cause of the alarm utilizing a Bayesian Belief Network (BBN), the BBN based on an evidence matrix including a plurality of entries corresponding to previously-detected alarm states in which the at least one parameter changed beyond the associated threshold and, for each of the plurality of entries, an indication of states of additional system parameters relative to additional predetermined thresholds at the times at which the previously-detected alarm states were triggered;

wherein the performance report includes an indication of the predicted root cause.

2. The system of claim 1, wherein the change detection module performs at least one of:

a Hotelling $T^2$ transform test, a Likelihood Ratio test, a combination of the Hotelling $T^2$ transform test and a Likelihood Ratio test, a z score calculation, a two sample t test, an entropy base test, an offline water detection test, a mean or base value shift test and a high slope detection test to generate the alarm.

3. The system of claim 1, wherein the BBN is formed based on prior operating data related to the at least one turbine.

4. The system of claim 1, wherein the evidence matrix is at least partially formed from operating data from turbines other than the at least one turbine.

5. The system of claim 1, wherein the evidence matrix further includes an indication of the actual cause of the alarm for each portion.

6. The system of claim 1, further including: a database for storing the BBN; and a learning tool coupled to the database that modifies the BBN based on the accuracy of BBN root cause predictions.

7. The system of claim 1, further comprising: a maintenance analyzer that creates a maintenance recommendation based on the report.

8. A method of determining a root cause of a turbine alarm for at least one turbine, the method comprising:

determining at a computing device that the turbine alarm exists;

determining at the computing device which, if any, other alarm conditions exist when the alarm conditions exist to create an event portion; and predicting the root cause of the event from the event portion by comparing the event portion to a Bayesian Belief Network (BBN), the BBN based on an evidence matrix including a plurality of entries corresponding to previously-detected alarm states in which the at least one parameter changed beyond the associated threshold and, for each of the plurality of entries, an indication of states of additional system parameters relative to additional predetermined thresholds at the times at which the previously-detected alarm states were triggered.

9. The method claim 8, wherein the BBN is formed based on prior operating data related to the at least one turbine.

10. The method of claim 1 wherein the evidence matrix is at least partially formed from operating data from turbines other than the at least one turbine.

11. A system including one or more central processing units (CPUs) and memory, the one or more CPUs configured to execute software stored in memory to control the turbine performance diagnostic system to create a scorecard for one or more turbines, the system including:

an assessment module that receives operating data from at least one turbine and produces the scorecard from the operating data, the assessment module including:

a change detection module configured to determine when at least one parameter including a heat of the one or more turbines has changed beyond an associated threshold and generate an alarm; and a scorecard generator that generates the scorecard, the scorecard including a status indication, the status indication being based on a characteristic of the parameter that generated the alarm, the characteristic including a change in heat rate of the one or more turbines after a compressor water wash.

12. The system of claim 11, wherein the scorecard is a unit scorecard related only to one of the one or more turbines.

13. The system of claim 11, wherein the scorecard generator generates a fleet scorecard that combines a plurality of unit scorecards.

* * * * *